J. WILDING.
HARROW.
APPLICATION FILED OCT. 20, 1909.
951,297.
Patented Mar. 8, 1910.
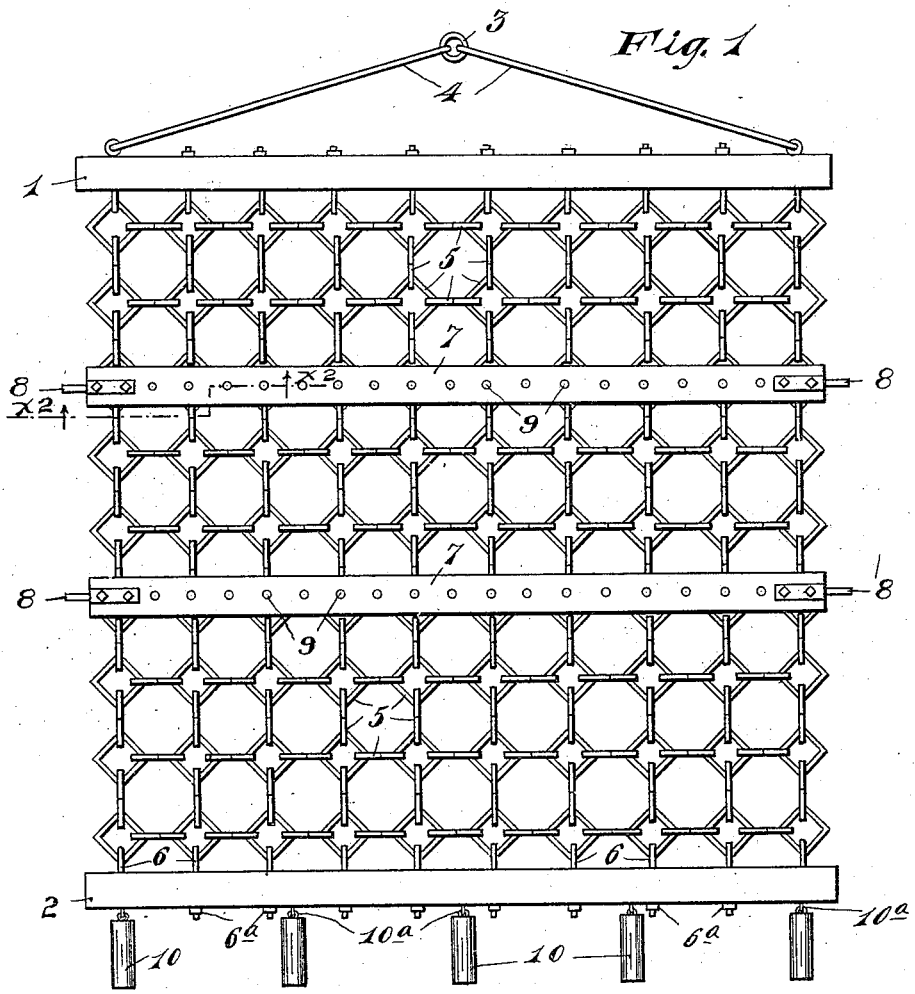
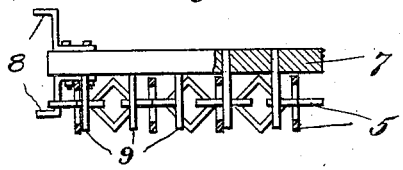
Witnesses:
E. C. Skinkle
A. H. Opsahl
Inventor:
Joseph Wilding,
By his Attorneys,
Williamson & Merchant

UNITED STATES PATENT OFFICE.

JOSEPH WILDING, OF KASPAR, SOUTH DAKOTA.

HARROW.

951,297. Specification of Letters Patent. Patented Mar. 8, 1910.

Application filed October 20, 1909. Serial No. 523,656.

*To all whom it may concern:*

Be it known that I, JOSEPH WILDING, a citizen of the United States, residing at Kaspar, in the county of Sully and State of South Dakota, have invented certain new and useful Improvements in Harrows; and I do hereby declare the following to be a full, clear, and exact description of the invention, such as will enable others skilled in the art to which it appertains to make and use the same.

My invention has for its object to provide a simple, cheap and efficient harrow, and to this end it consists of the novel devices and combinations of devices hereinafter described and defined in the claims.

In the accompanying drawings, which illustrate the invention, like characters indicate like parts throughout the several views.

Referring to the drawings, Figure 1 is a plan view of the improved harrow; and Fig. 2 is a transverse vertical section taken on the irregular line $x^2$ $x^2$ of Fig. 1.

The numerals 1 and 2 indicate, respectively, a front drag bar and a rear drag bar laterally spaced one from the other. The front drag bar 1, as shown, is secured to a ring 3 by means of a pair of pivotally connected draft rods 4. The ring 3, of course, affords a device to which a suitable draft device may be attached, for the purpose of drawing the harrow over the ground. A plurality of interlocked, horizontal and vertical links 5 are secured to and between the drag bars 1 and 2, by means of eye bolts 6. The stems of the eye bolts 6 are passed through the drag bars 1 and 2 and secured thereto by nuts 6ª and the eyes of the bolts are loosely connected to the front and rear rows of horizontal links 5. By reference to Fig. 1, it will be noted that the horizontal links connect the vertical links in rectangular arrangement. It will also be noted that the vertical links which extend in a direction transversely across the drag bars 1 and 2 will form narrow channels in the surface of the soil and that the vertical links which extend in a direction parallel to the drag bars 1 and 2 will form an approximately V-shaped channel in the soil, as the harrow is dragged over the surface of the same and by this arrangement of links, in respect to each other, the soil is thoroughly pulverized.

A pair of reversible spacing bars 7 are detachably secured to the two outer rows of links 5, by means of Z-shaped hooks 8. The hooks 8 are arranged in pairs and are secured to each end of the spacing bars 7. The hooks 8 of each pair project in opposite directions from each other and from opposite sides of the spacing bars 7. By the arrangement of the hooks 8, the spacing bars 7 may be detachably secured to the links 5 with either side up. On one side of each spacing bar 7 is rigidly secured a row of rake teeth 9 and, as is evident, the spacing bars act as rakes when they are turned so that the teeth project downward. In order to increase the drag of the harrow, a series of drag weights 10 are secured to the outer edge portion of the rear drag bar 2 by means of eye bolts 10ª.

The harrow above described, while of small cost, is efficient for the purposes had in view.

What I claim is:

1. In a harrow, the combination with a drag bar, of a plurality of interlocked links secured to said drag bar, and a toothed spacing bar secured to said links and serving as a rake, substantially as described.

2. In a harrow, the combination with a drag bar, of a plurality of interlocked rectangular links secured to said drag bar, and a reversible spacing bar detachably secured to said links and provided with teeth on one side and serving as a rake when said teeth are turned downward, substantially as described.

3. In a harrow, the combination with a pair of laterally spaced front and rear drag bars, of a plurality of interlocked rectangular links secured between said drag bars, drag weights secured to said rear drag bar, and a reversible spacing bar detachably secured to said links and provided with teeth on one side and serving as a rake when said teeth are turned downward, substantially as described.

In testimony whereof I affix my signature in presence of two witnesses.

JOSEPH WILDING.

Witnesses:
L. E. SNYDER,
J. H. GROPENGIESER.